(12) United States Patent
Kayama et al.

(10) Patent No.: US 7,161,269 B2
(45) Date of Patent: Jan. 9, 2007

(54) VIBRATION GENERATOR AND ELECTRONIC APPARATUS

(75) Inventors: Shun Kayama, Saitama (JP); Yukiko Shimizu, Saitama (JP); Masahiro Suzuki, Kanagawa (JP); Toshinori Yamasue, Shiga (JP); Hiroshi Azuma, Osaka (JP); Hirokazu Kitamura, Kyoto (JP)

(73) Assignees: Sony Corporation, Tokyo (JP); Omron Corporation, Kyoto (JP)

( * ) Notice: Subject to any disclaimer, the term of this patent is extended or adjusted under 35 U.S.C. 154(b) by 0 days.

(21) Appl. No.: 10/522,337

(22) PCT Filed: Jun. 3, 2004

(86) PCT No.: PCT/JP2004/008067

§ 371 (c)(1),
(2), (4) Date: Jul. 15, 2005

(87) PCT Pub. No.: WO2004/108306

PCT Pub. Date: Dec. 16, 2004

(65) Prior Publication Data

US 2006/0082231 A1   Apr. 20, 2006

(30) Foreign Application Priority Data

Jun. 3, 2003 (JP) ............... 2003-157471
Aug. 5, 2003 (JP) ............... 2003-286438

(51) Int. Cl.
H02K 7/06 (2006.01)

(52) U.S. Cl. ........................................ 310/81

(58) Field of Classification Search ............ 310/81, 310/254, 67 R, 208; 340/407.1, 7.3, 7.6
See application file for complete search history.

(56) References Cited

U.S. PATENT DOCUMENTS

| 4,980,590 | A | * | 12/1990 | Taniguchi et al. | ............ 310/81 |
| 5,801,466 | A | * | 9/1998 | Odagiri et al. | ............ 310/81 |
| 5,898,248 | A | * | 4/1999 | Ikeda et al. | ............ 310/91 |
| 2004/0256930 | A1 | * | 12/2004 | Kim | ............ 310/81 |

FOREIGN PATENT DOCUMENTS

| JP | 11-218713 | 8/1999 |
| JP | 2001-231197 | 8/2001 |
| JP | 2001-232290 | 8/2001 |

* cited by examiner

*Primary Examiner*—Tran Nguyen
(74) *Attorney, Agent, or Firm*—Oblon, Spivak, McClelland, Maier & Neustadt, P.C.

(57) ABSTRACT

There is provided a vibration generator (40) in which a rotor with an unbalancer is rotated. The vibration generator includes a bottom plate (47) having a flat coil substrate (120) installed thereto, a stationary shaft (91) provided perpendicularly to the bottom plate, a magnet (85) installed on the stationary shaft (91) with a freely rotatable bearing being disposed between them and opposite to the surface of the flat coil substrate (120) with a slight clearance defined between them, and a weight (87) installed to the magnet (85). For generating a vibration, a current is supplied to the coil on the flat coil substrate (120) to rotate the magnet (85) and weight (87). The bottom plate (47) is formed from a nonmagnetic material. A thin magnetic plate (48) is installed at the side opposite to the magnet (85) with the bottom plate (47) being placed between the thin magnetic plate (48) and magnet (85).

4 Claims, 18 Drawing Sheets

VIBRATION GENERATOR AND ELECTRONIC APPARATUS

TECHNICAL FIELD

The present invention relates to a vibration generator which generates a vibration by rotating a rotor, and an electronic device in which the vibration generator is used.

This application claims the priority of the Japanese Patent Application Nos. 2003-157471 filed on Jun. 3, 2003 and 2003-286438 filed on Aug. 5, 2003, the entirety of which is incorporated by reference herein.

BACKGROUND ART

For the convenience of the explanation of the present invention, a mobile phone will be taken as a typical example of the electronic devices. The mobile phone has a structure which generates a vibration to inform the user of an incoming call when it is set in the so-called "manner mode" of operation. Such a mobile phone incorporates a vibration generator as a vibration actuator which generates a vibration. The vibration generator of this type is disclosed in the Japanese Patent No. 3187029. The disclosed vibration generator is a small vibration motor having an eccentric weight intended for generation of a vibration.

However, the above-mentioned conventional vibration generator has problems as will be described below:

The motor with a brush is not reliable on the operation of vibration generation because the non-revolution problem caused by a so-called slit short-circuit cannot be eliminated.

Also, the motor body can be designed to have a diameter as small as about 3.5 mm, but the motor speed and power consumption are too great. Apparently, the power consumption should be as small as possible because a smaller power consumption will lead to a longer service life of the battery used in a portable electronic device such as the mobile phone. Along with the demand for an smaller and thinner design of the electronic device in which such a vibration generator is to be incorporated, it has been demanded to design the smaller and simpler vibration generator and the electronic device which is to use the vibration generator in it.

To meet the above requirements, it has been proposed to design the vibration generation like a small coin. For designing the flat vibration generator of this type to be more compact, the rotor is reduced in weight due to the smaller and thinner design with such a result that the friction will be increased because the attraction of the rotor toward a bottom plate by the magnetism of a magnet increases. On this account, the magnet may be designed smaller or the bottom plate is formed thinner to reduce the magnetism. However, this will lead to a reduction in running torque of the rotor and also to an insufficient structural strength. It will be difficult to provide a highly reliable vibration generator.

DISCLOSURE OF THE INVENTION

Accordingly, the present invention has an object to overcome the above-mentioned drawbacks of the related art by providing an improved and novel vibration generator, and an electronic device in which the vibration generator is used.

The present invention has another object to provide a highly reliable vibration generator which is free from any reduction of running torque of a rotor which rotates a transducer as well as from insufficient structural strength, and an electronic device in which the vibration generator is used.

The above object can be attained by providing a vibration generator according to the present invention including:
  a bottom plate having a flat coil substrate installed thereto;
  a stationary shaft provided perpendicularly to the bottom plate;
  a magnet installed on the stationary shaft with a freely rotatable bearing being disposed between them and opposite to the surface of the flat coil substrate with a slight clearance defined between them;
  an unbalancer installed to the magnet; and
  a thin magnetic plate,
  wherein, a current being supplied to a coil on the flat coil substrate to rotate the magnet and unbalancer for generating a vibration,
  the bottom plate being formed from a nonmagnetic material; and
  the thin magnetic plate is installed at the side opposite to the magnet with the bottom plate being interposed between the thin magnetic plate and the magnet.

Since the above vibration generator according to the present invention has the bottom plate formed from a nonmagnetic material, the magnetism of the magnet will cause no force of attraction between the magnet and bottom plate and thus the rotor including the magnet will have the rotation thereof less blocked by the force of attraction. Also, since the thin magnetic plate is provided at the side opposite to the magnet with the bottom plate being interposed between them, the rotor including the magnet can be prevented by the force of attraction between the thin magnetic plate and magnet from being lifted due to its own rotation. That is, the force of attraction of the magnet will be adjustable because of the area of the thin magnetic plate, the rotor rotation will not be impaired, and an optimum force of attraction for prevention of the rotor from being lifted will be settable.

In the vibration generator according to the present invention, rotation of the rotor with the weight causes little shaft deflection. So, the vibration generator has a long service life, and can accommodate the smaller and thinner design of an electronic device in which it is to be incorporated. Also, the smaller and thinner design of the vibration generator itself will suppress any rotation loss of the rotor, and the rotor can be prevented from being lifted due to its own rotation.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The vibration generator according to the present invention and electronic device in which the vibration generator is used will be described in detail below with reference to the accompanying drawings.

Figure 1:
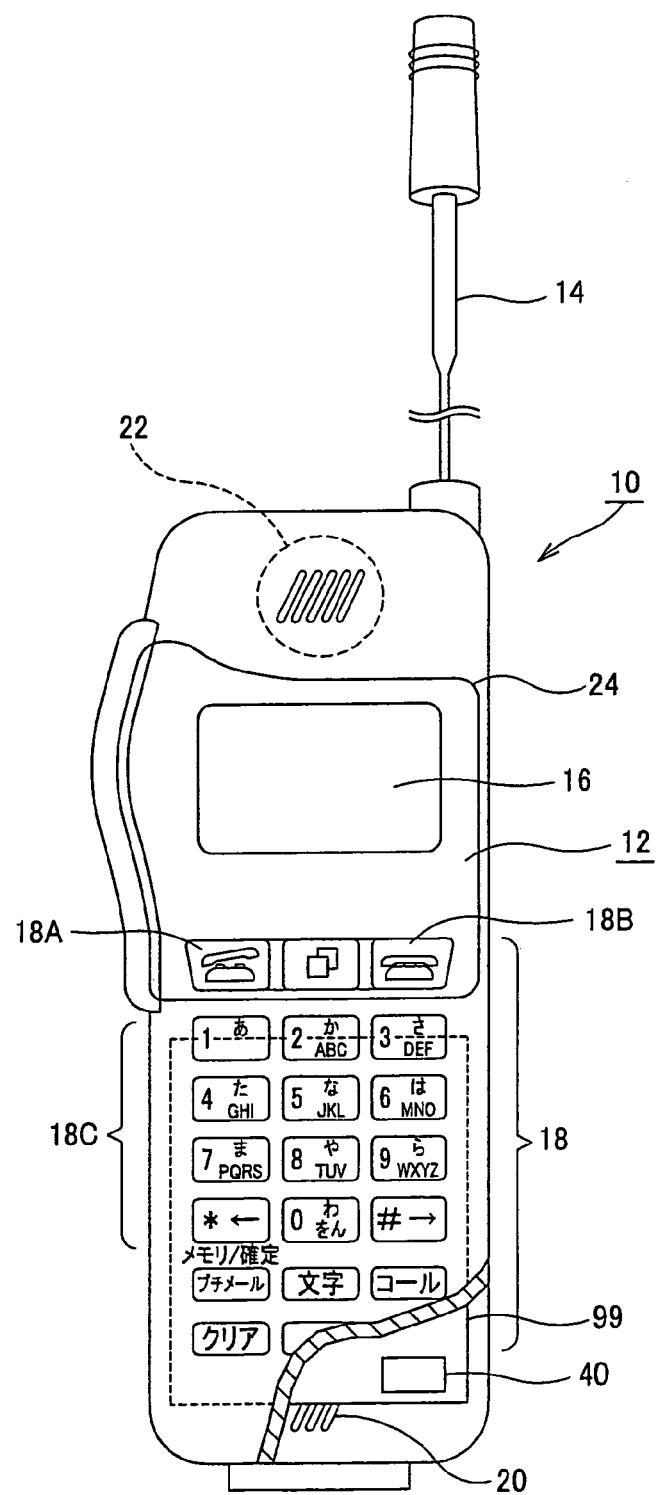
FIG. 1 is a front view of a mobile phone as an electronic device including the vibration generator according to the present invention.
Figure 2:
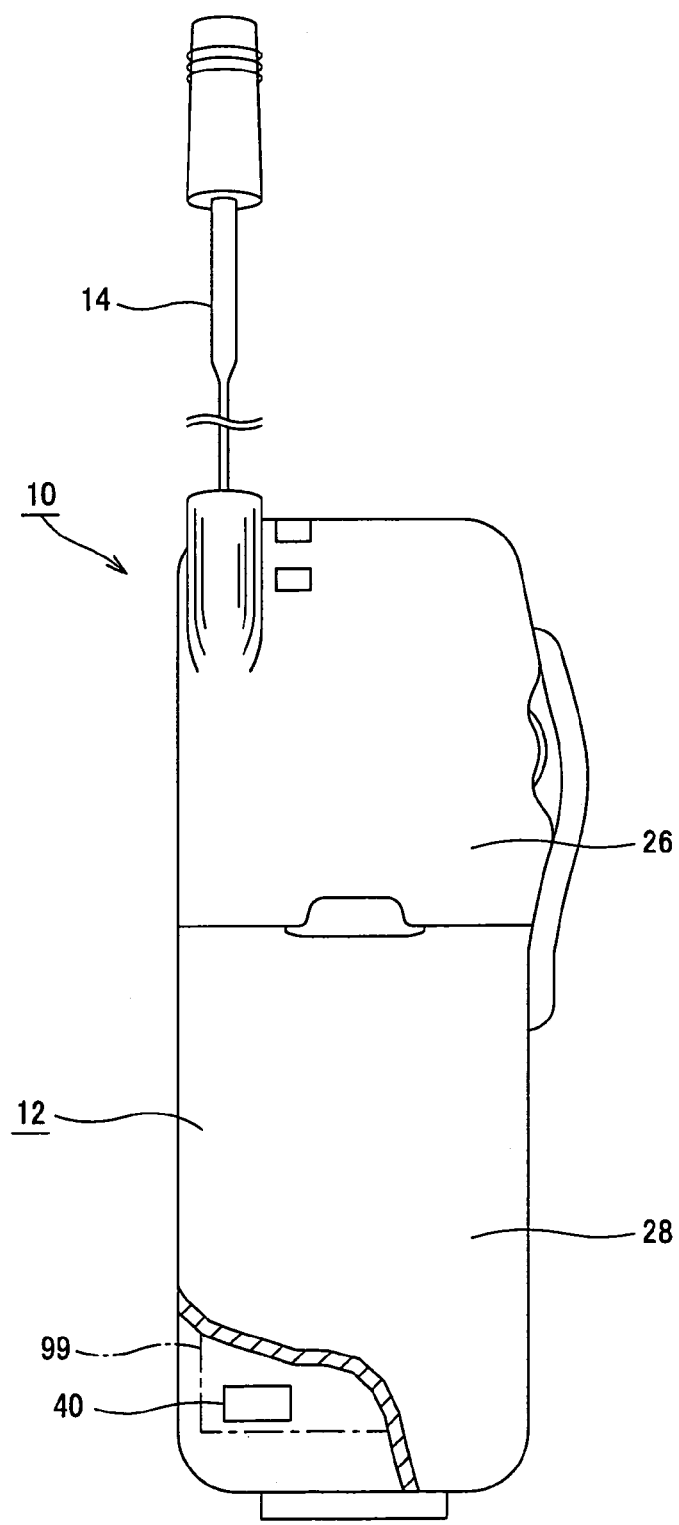
FIG. 2 is a rear view of the mobile phone including the vibration generator according to the present invention.

The vibration generator according to the present invention is used in a mobile phone as shown in FIGS. 1 and 2. The mobile phone indicated with a reference 10 is an example of electronic devices in which the vibration generator according to the present invention is usable. The mobile phone 10 is for example a digital type one using a carrier frequency band of 0.8 to 1.5 GHz. As shown in FIGS. 1 and 2, the mobile phone 10 includes a housing 12, antenna 14, display 16, operation panel 18, microphone 20, speaker 22, etc.

The operation panel 18 has a variety of operation keys as shown in FIG. 1. The operation keys include a talk button 18A, talk-off button 18B, ten keys 18C, etc. The display 16 may be formed from a liquid crystal display device, for example.

The housing 12 includes a front portion 24 shown in FIG. 1 and a rear portion 26 shown in FIG. 2. The rear portion 26 can have a battery 28 removably installed therein. The antenna 14 is telescopically installed to the housing 12.

The housing 12 shown in FIG. 1 incorporates a vibration generator 40 according to the present invention. Being used in the mobile phone 10 for example, the vibration generator 40 will generate a vibration upon reception of an incoming call. Namely, the vibration generator 40 can inform the user of the incoming call.

Figure 3:
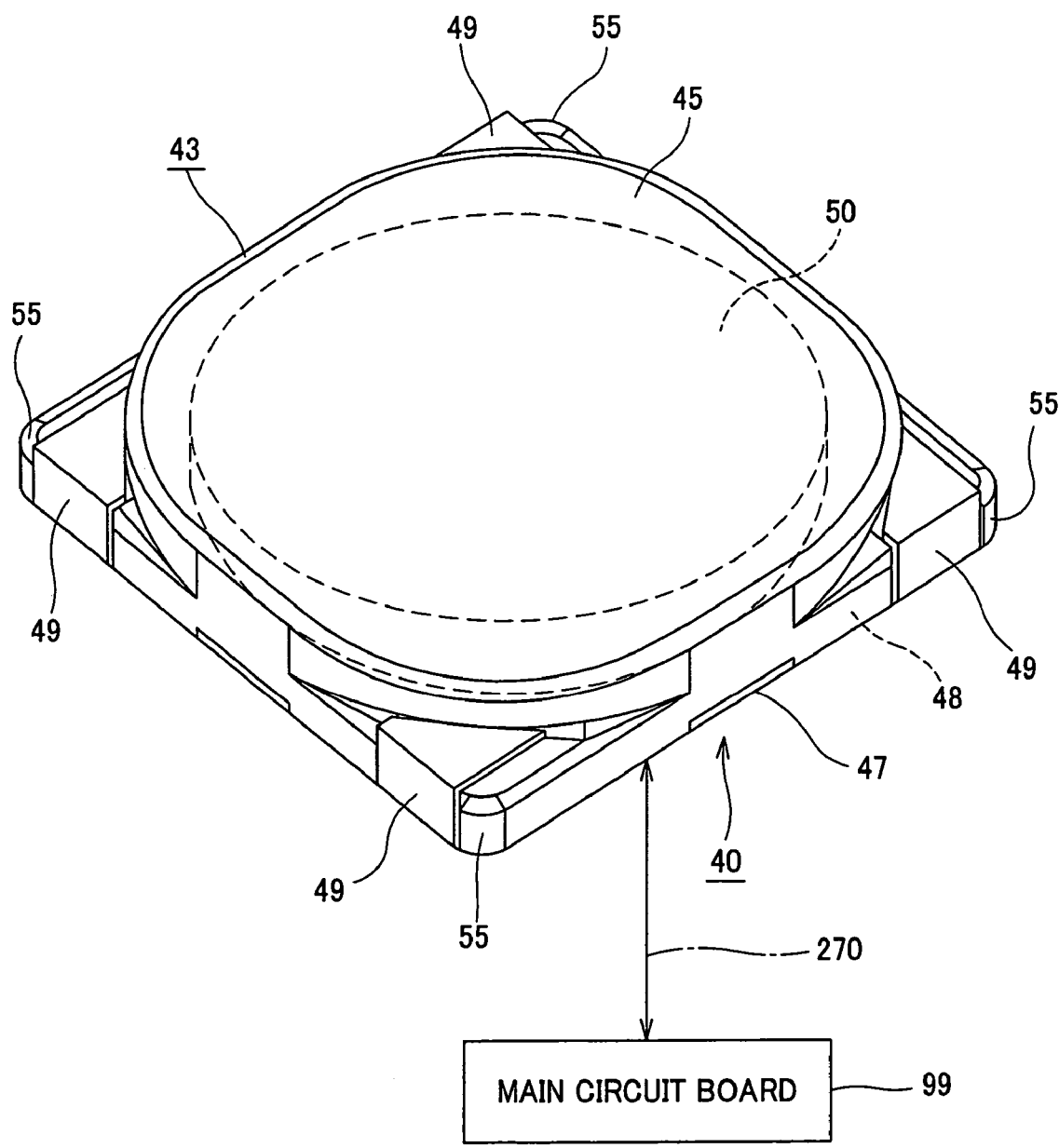
FIG. 3 is a perspective view of the vibration generator according to the present invention.

FIG. 3 is a perspective view illustrating the outline structure of the vibration generator in detail. The vibration generator 40 is also called "vibration actuator". It includes a case 43, and a vibration motor 50 housed in the case 43.

Figure 4:
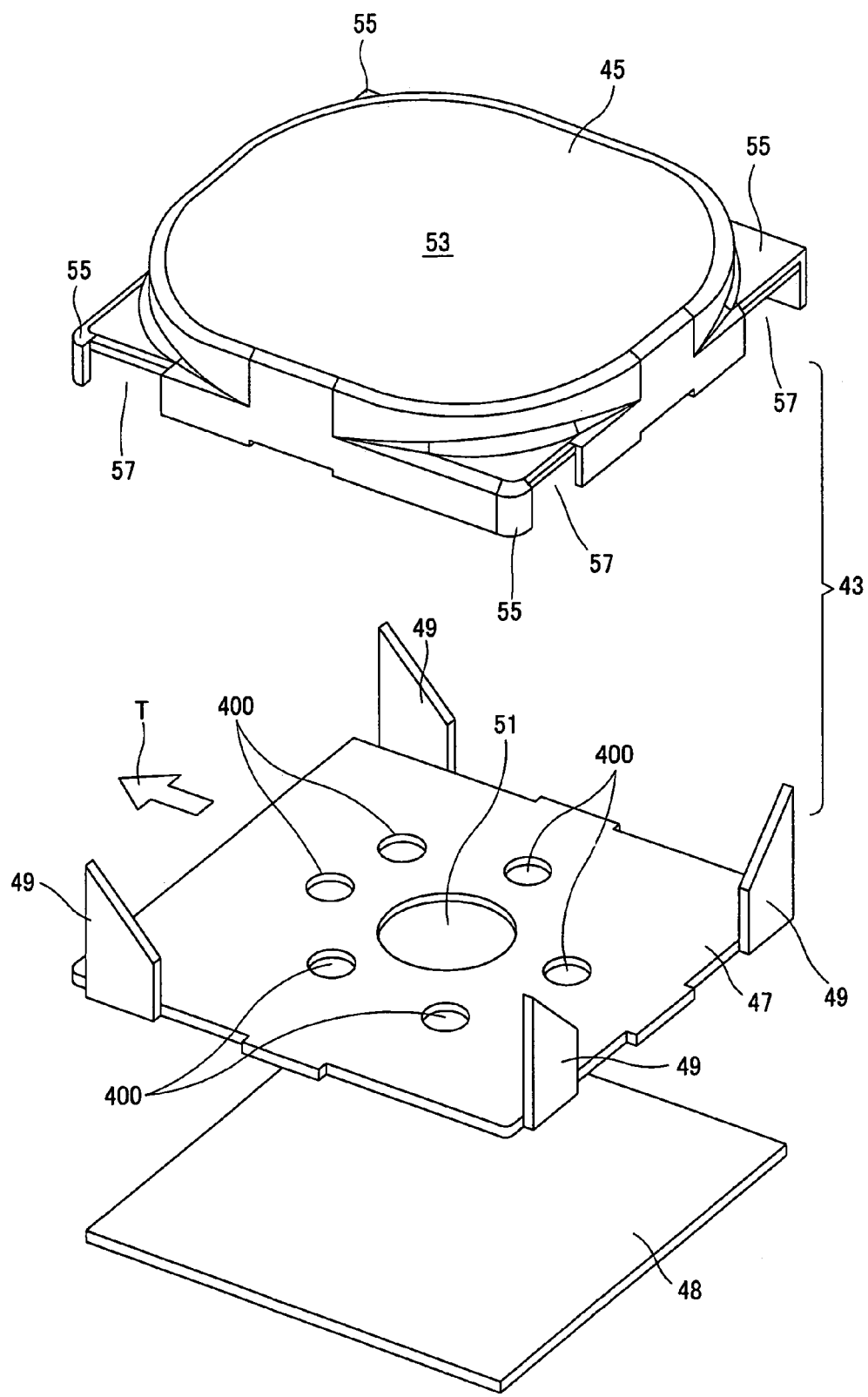
FIG. 4 is an exploded perspective view of a case for the vibration generator.

FIG. 4 is an exploded perspective view of a case 43 of the vibration generator 40. The vibration motor 50 is not shown in FIG. 4. The case 43 includes a lid member 45, bottom plate 47 and a thin magnetic plate 48.

The lid member 45 of the case 43 is formed from a magnetic-permeable material such as iron, magnetic stainless steel, silicon steel plate or the like. The lid member 45 closes the magnetic circuit. It should be noted that the lid member 45 may of course be omitted whenever unnecessary.

The bottom plate 47 is a generally square plate formed from a nonmagnetic material such as aluminum, stainless steel or the like. The bottom plate 47 has a to-be-swaged portion 49 formed at each corner thereof. The bottom plate 47 has an opening 51 formed in the center thereof.

Further, a plurality of holes 400 is formed in the bottom plate 47 equidistantly around the opening 51. Since the bottom plate 47 is formed from the nonmagnetic material, any force of attraction due to the magnetism of a magnet 85 of a rotor 80 will not develop between the magnet 85 and bottom plate 47 and so the rotation of the rotor 80 or the like will not be blocked by the force of attraction.

The thin magnetic plate 48 is formed from a magnetic-permeable material such as iron, magnetic stainless steel, silicon steel plate or the like. The thin magnetic plate 48 is installed at the side opposite to the magnet 85 of the rotor 80 (outside the bottom plate 47) with the bottom plate 47 being interposed between them. So, the magnet 85 is attracted toward the bottom plate 47 under the effect of the force of attraction between the thin magnetic plate 48 and magnet 85 to prevent the rotor 80 from being lifted due to its own rotation.

The lid member 45 shown in FIG. 4 includes a generally circular flat portion 53 and four corners 55. Each of the corners 55 is cut (indicated at 57). By fitting the to-be-swaged portion 49 in a corresponding one of the cuts 57 and mechanically swaging the portion 49, the lid member 45 and bottom plate 47 will be assembled integrally with the vibration motor 50 being placed between them as shown in FIG. 3.

The thin magnetic plate 48 is attached with an adhesive or the like to the bottom plate 47. It should be noted that the thin magnetic plate 48 may be removably attached to the bottom plate 47, which will permit to easily replace the thin magnetic plate 48 with any one having a desired size and shape whenever necessary.

The vibration motor 50 shown in FIG. 3 is electrically connected to a main circuit board 99 via an electrical connecting terminal 270.

Figure 5:
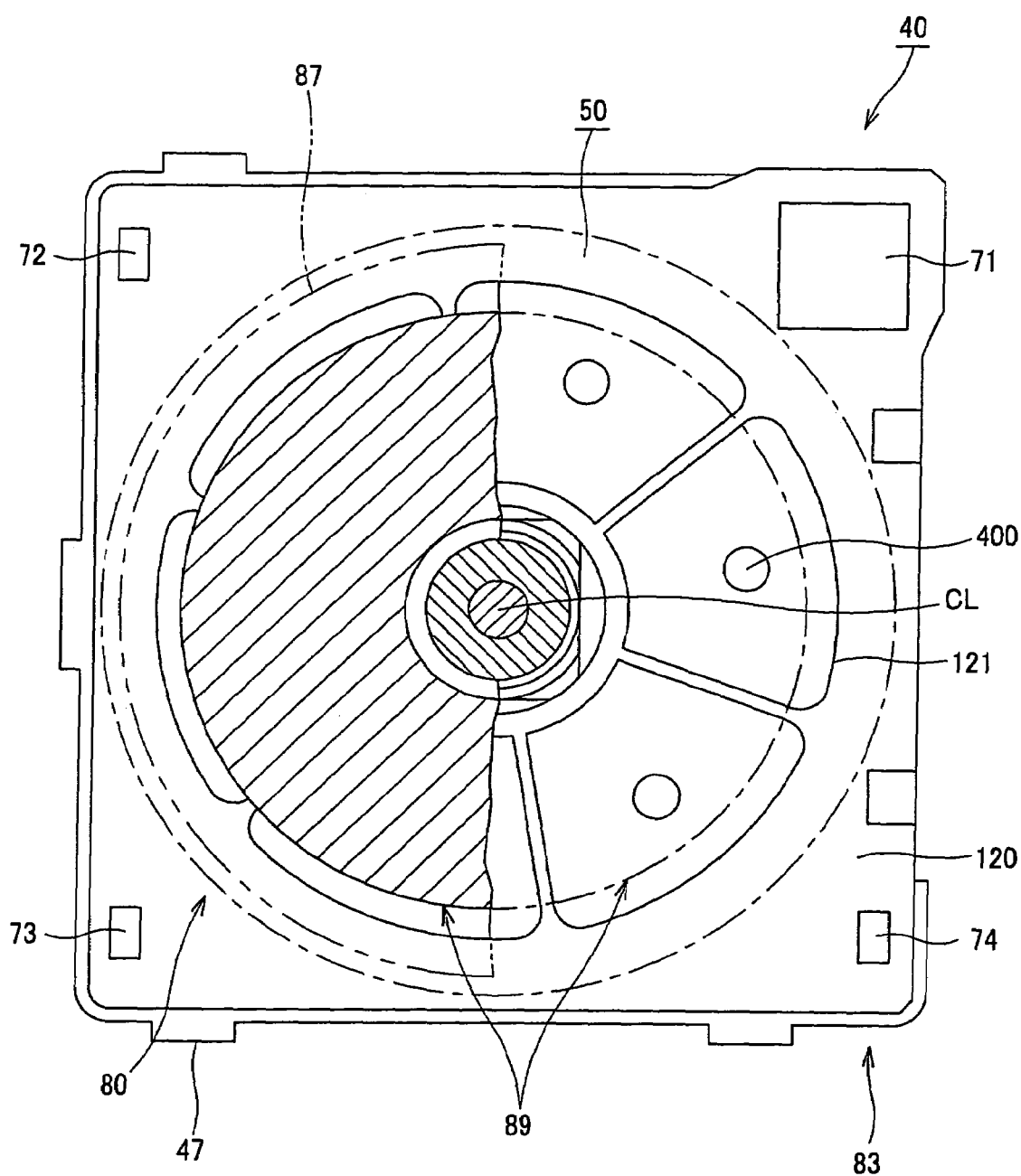
FIG. 5 is a partially fragmentary plan view showing the internal structure of the vibration generator.
Figure 6:
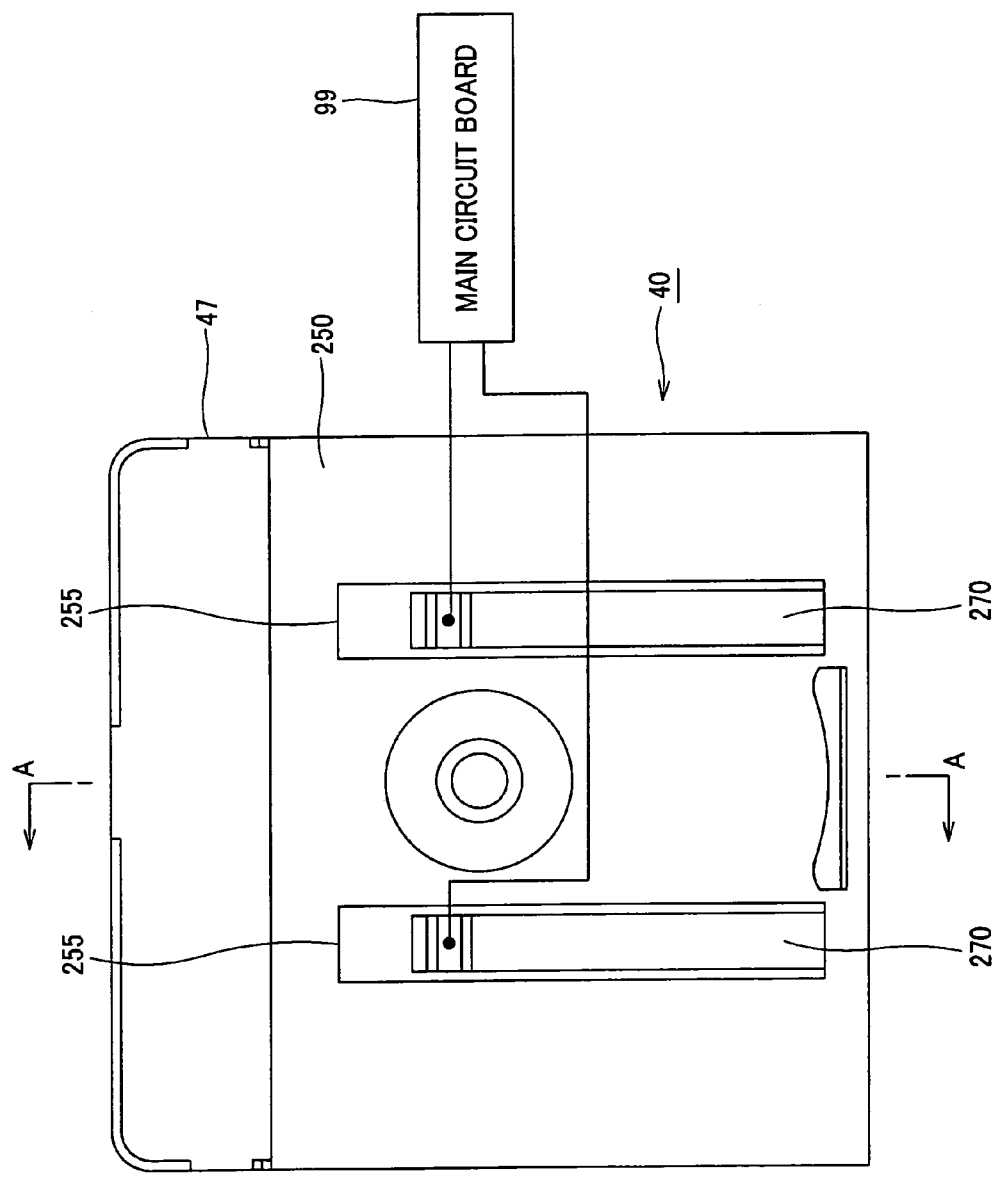
FIG. 6 is a bottom view of the vibration generator.
Figure 7:
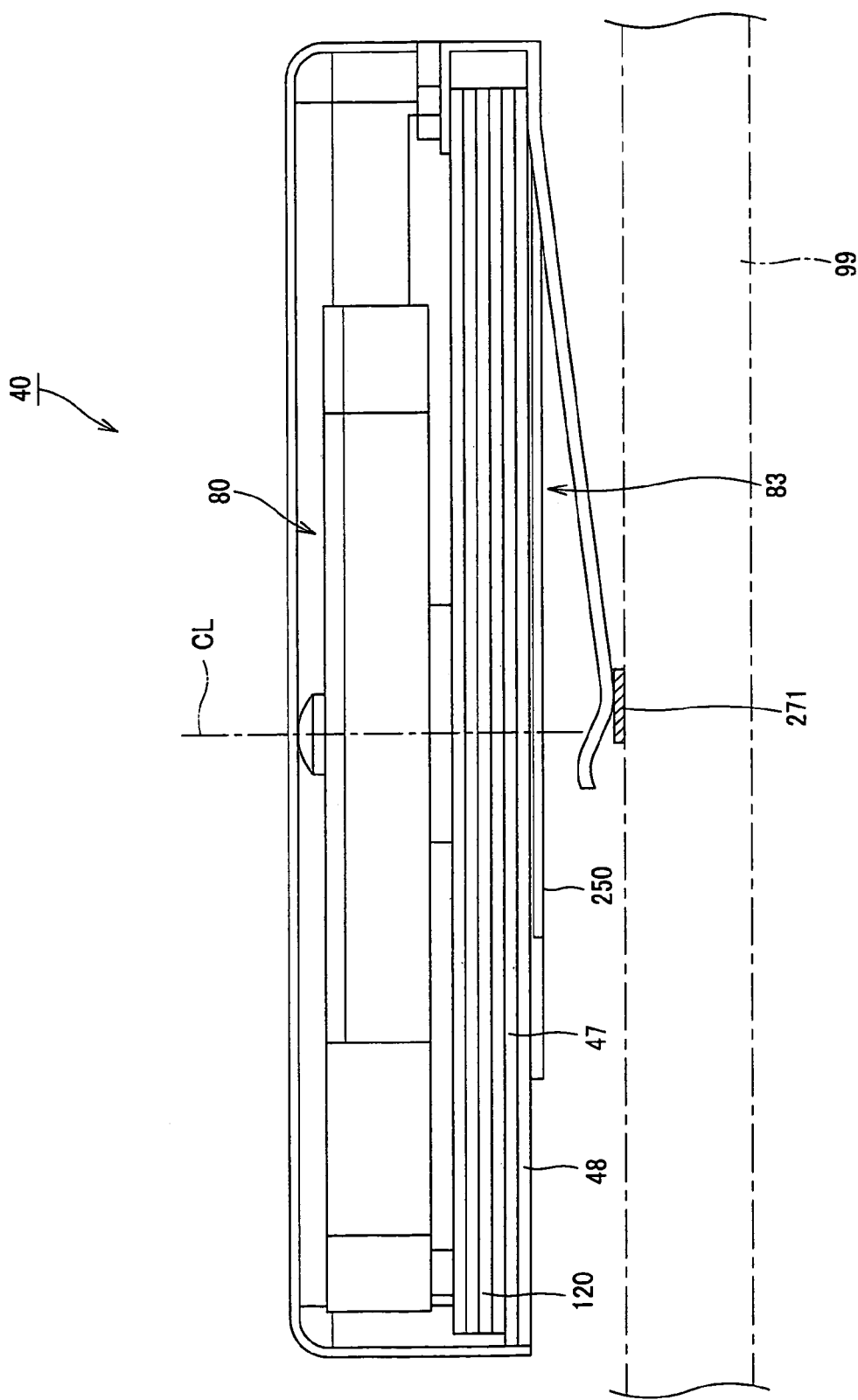
FIG. 7 is a sectional view of the vibration generator, taken along the line A—A in FIG. 6.
Figure 8:
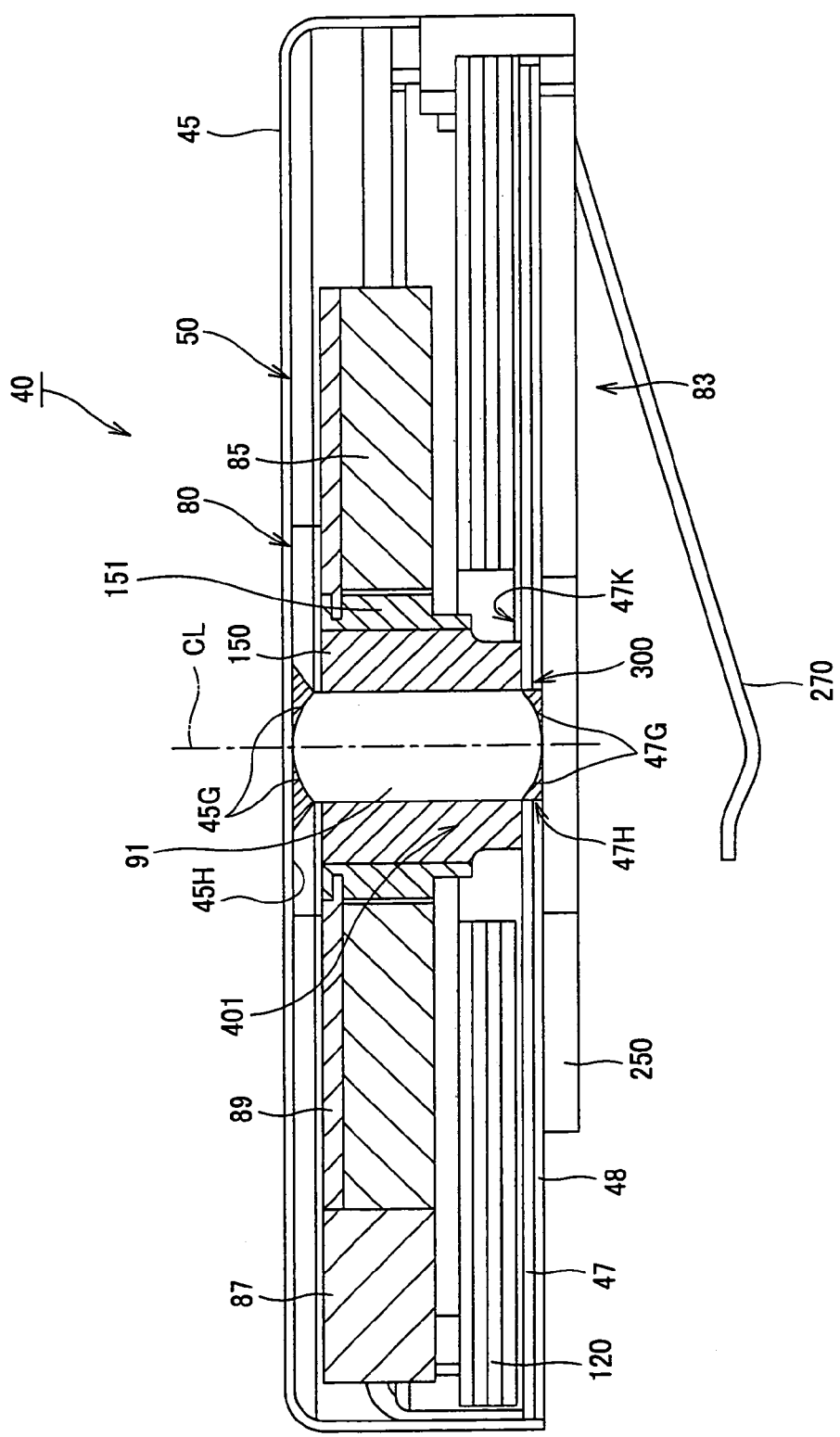
FIG. 8 is a sectional side view showing the internal structure of the vibration generator.

FIG. 5 is a partially fragmentary plan view with the lid member 45 in FIG. 4 being omitted to show a shape example of the vibration generator. FIG. 6 is a bottom view showing a shape example of the vibration generator. FIG. 7 is a sectional view of the vibration generator, taken along the line A—A in FIG. 6. FIG. 8 is a sectional side view showing the internal structure of the vibration generator in FIG. 7 in further detail.

As shown in FIG. 4, the lid member 45 is formed from a material which can form a magnetic circuit, such as iron or stainless steel, for example. As shown in FIG. 5, the bottom plate 47 and lid member 45 houses, in the space defined between them, the vibration motor 50 and a plurality of electronic parts 71, 72, 73 and 74, for example.

The lid member 45 is fixed to the bottom plate 47 with the vibration motor 50 being placed between them by swaging the to-be-swaged portions 49 as shown in FIGS. 3 and 4. The vibration motor 50 includes a rotor 80 and stator 83.

In the vibration motor 50 of the vibration generator 40, the stator 83 supports the rotor 80 to be rotatable. When the rotor 80 of the vibration motor 50 in the vibration generator 40 is put into run by supplying a current to a flat coil substrate 120 on the stator 83 from the main circuit board 99 shown in FIG. 3, it will generate a vibration.

The rotor 80 of the vibration motor 50 is constructed as will be described below. As shown in FIG. 7, the rotor 80 is continuously rotatable about the central axis CL in relation to the stator 83. As shown in FIG. 8, the rotor 80 includes a bearing 150, sleeve 151, magnet 85, vibration generating weight 87 and a rotor yoke 89.

The bearing 150 has a cylindrical shape. It is formed from a sintered metal or resin, for example. In case the bearing 150 is formed from a resin, for example, PPS (polyphenylene sulfide) may be employed.

The sleeve 151 is fixed to the outer surface of the bearing 150 by press fitting, for example. The sleeve 151 is also called "bearing housing". It is formed from a metal such as brass, aluminum, stainless steel or the like. Also, it may be formed from a resin (PPS, for example). In the embodiment shown in FIG. 8, the bearing 150 and sleeve 151 are separate pieces, but they may be integrally with each other, which will contribute to reduction of the number of parts used and also to reduction of the number of assembling steps.

The energizing magnet 85 is disposed on the sleeve 151 as shown in FIG. 8. The magnet 85 is a toroidal or annular one formed from a sintered material such as neodium-iron-boron compound or samarium-cobalt compound. The magnet 85 is fixed with an adhesive, for example, to the inner wall of the rotor yoke 89. The magnet 85 shown in FIG. 8 is a multipole-magnetic type having S and N poles laid alternately along the circumference thereof.

The rotor yoke 89 is formed from a magnetic-permeable material such as iron, stainless steel or the like. It is fixed to the outer surface of the sleeve 151 (or bearing 150 in case the sleeve 151 and bearing 150 are integral with each other) by press fitting, bonding, ultrasonic welding, swaging or by all these techniques.

For fixing the rotor yoke 89 to the sleeve outer surface by the ultrasonic welding, a triangular pyramid-shaped projection (not shown) provided on the end face of the sleeve 151 (or bearing 150 in case the sleeve 151 and bearing 150 are integral with each other) will permit to efficiently apply ultrasonic wave from the ultrasound emission horn through the projection and weld the rotor yoke 89 and the sleeve outer surface to each other. The rotor yoke 89 is generally equal in diameter to the magnet 85.

Figure 15A:
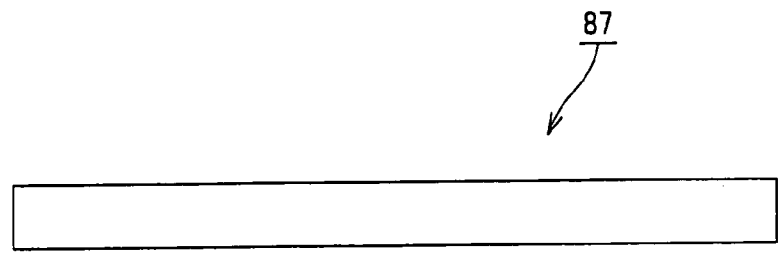
FIG. 15A is a side elevation of a vibration generating weight.
Figure 15B:
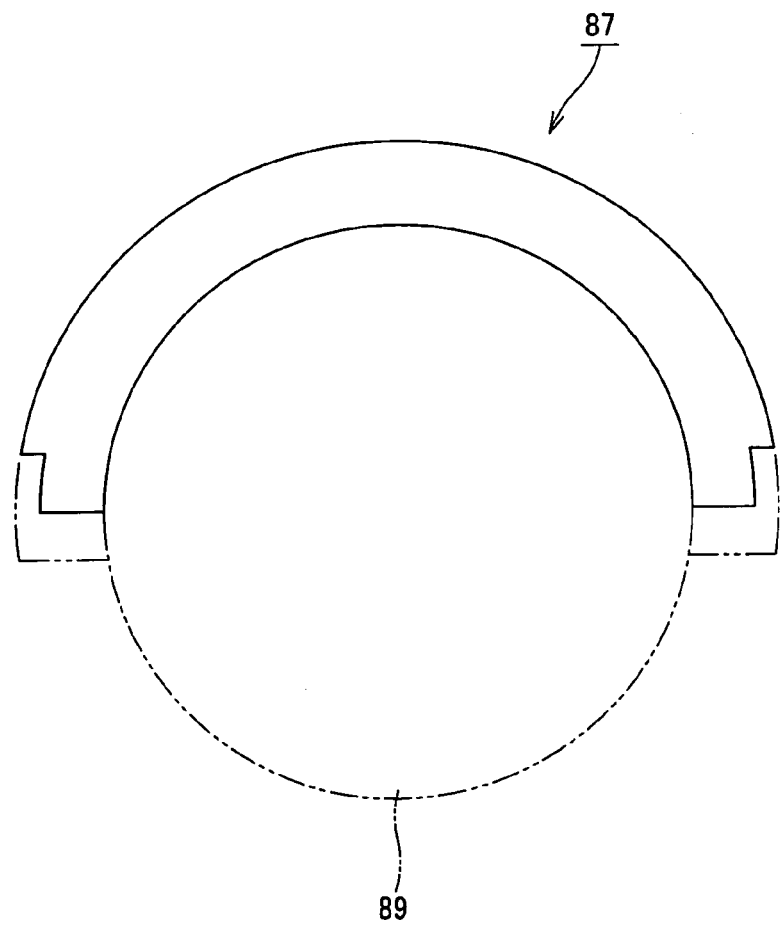
FIG. 15B is a plan view of the vibration generating weight.

The weight 87 is fixed to the outer surfaces of the rotor yoke 89 and magnet 85 as shown in FIG. 8. The weight 87 is semicircular in shape as shown in FIGS. 15A and 15B, and it is fixed to the rotor yoke 89 and magnet 85 by swaging or welding or with any other fixing technique as shown in FIG. 5, for example.

The weight 87 is an unbalancer to take out an unbalanced rotation-caused energy as a vibration component by continuously rotating the rotor 80 shown in FIG. 5 about the central axis CL of a shaft 91 in relation to the stator 83. The weight 87 is formed from a material having a large specific gravity such as tungsten, for example.

The rotor 80 shown in FIG. 8 is disposed in a space defined between the lid member 45 and bottom plate 47. Thus, the magnet 85 and flat coil substrate 120 are disposed opposite to each other with a slight clearance being defined between them.

The stator 83 is constructed as shown in FIG. 8. The stator 83 includes the bottom plate 47, thin magnetic plate 48, flat coil substrate 120, stationary shaft 91, terminal housing 250 and electrical connecting terminal 270.

The electrical connecting terminal 270 is electrically connected to the flat coil substrate 120 by soldering, for example. The electrical connecting terminal 270 electrically connects the flat coil substrate 120 to an electrode 271 of the main circuit board 99 as shown in FIG. 7. The electrical connecting terminal 270 is a so-called cantilever type and may be formed from an elastically deformable conductive metal such as Au or Cu.

The terminal housing 250 shown in FIG. 8 is rectangular in shape as shown in FIG. 6. It is a member to fix the electrical connecting terminal 270 to the bottom plate 47. The terminal housing 250 is formed from an electrical insulating resin such as PPS, LCP (liquid crystal polymer) or the like. The terminal housing 250 covers almost the entirety of the bottom plate 47 as shown in FIG. 6. However, the terminal housing 250 has two openings 255 formed therein, and two electrical connecting terminals 270 are exposed through the openings 255, respectively.

The stationary shaft 91 in FIG. 8 is welded, for example, to the lid member 45 and bottom plate 47 from which it depends. The central axis CL passes through the stationary shaft 91. The stationary shaft 91 is fixed at one end thereof to an inner surface 45H of the lid member 45 by welding (indicated at a reference 45G). Also, the stationary shaft 91 is fixed at the other end thereof to an inner surface 47H of the hole in the bottom plate 47 by welding (indicated at a reference 47G).

The stationary shaft 91 is formed from stainless steel, for example. It is formed rather short along the central axis CL. Both ends of the stationary shaft 91 are shaped round, not flat.

Therefore, the stationary shaft 91 can be positively fixed at one and other ends thereof to the lid member 45 and bottom plate 47 by welding (indicated at the references 45G and 47G). It should be noted that one or both of the ends of the stationary shaft 91 may be formed flat as necessary.

The stationary shaft 91 is inserted in the bearing 150 of the rotor 80 and thus supported in the bearing 150 to be radially rotatable.

The flat coil substrate 120 of the stator 83 is constructed as will be described below. The flat coil substrate 120 shown in FIG. 8 has a plurality of driving patterns 121 as shown in an exploded perspective view in FIG. 9. The driving patterns 121 are arranged circumferentially of an opening 120H about the central axis CL.

Figure 9:
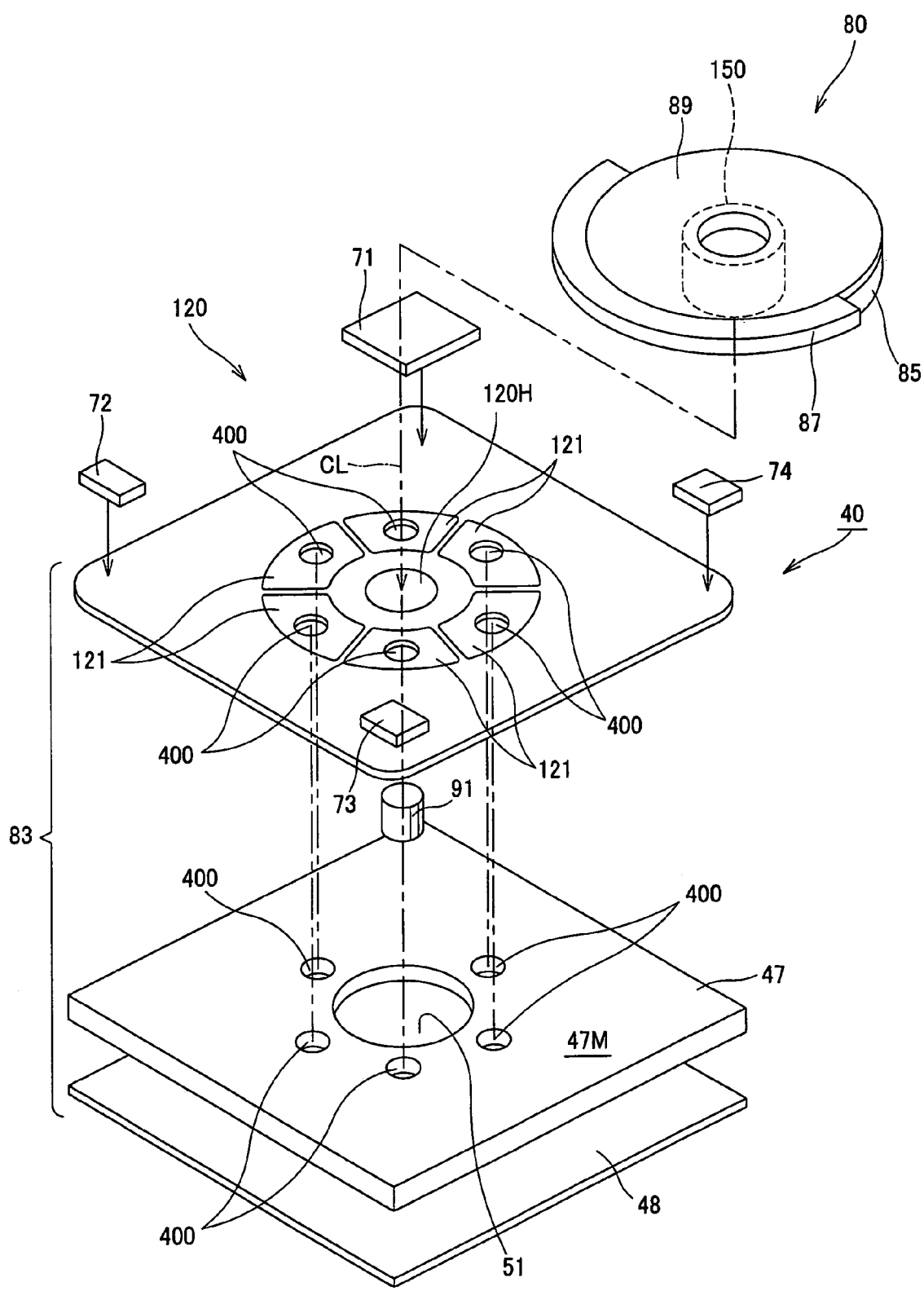
FIG. 9 is an exploded perspective view of a rotor and stator.
Figure 10:
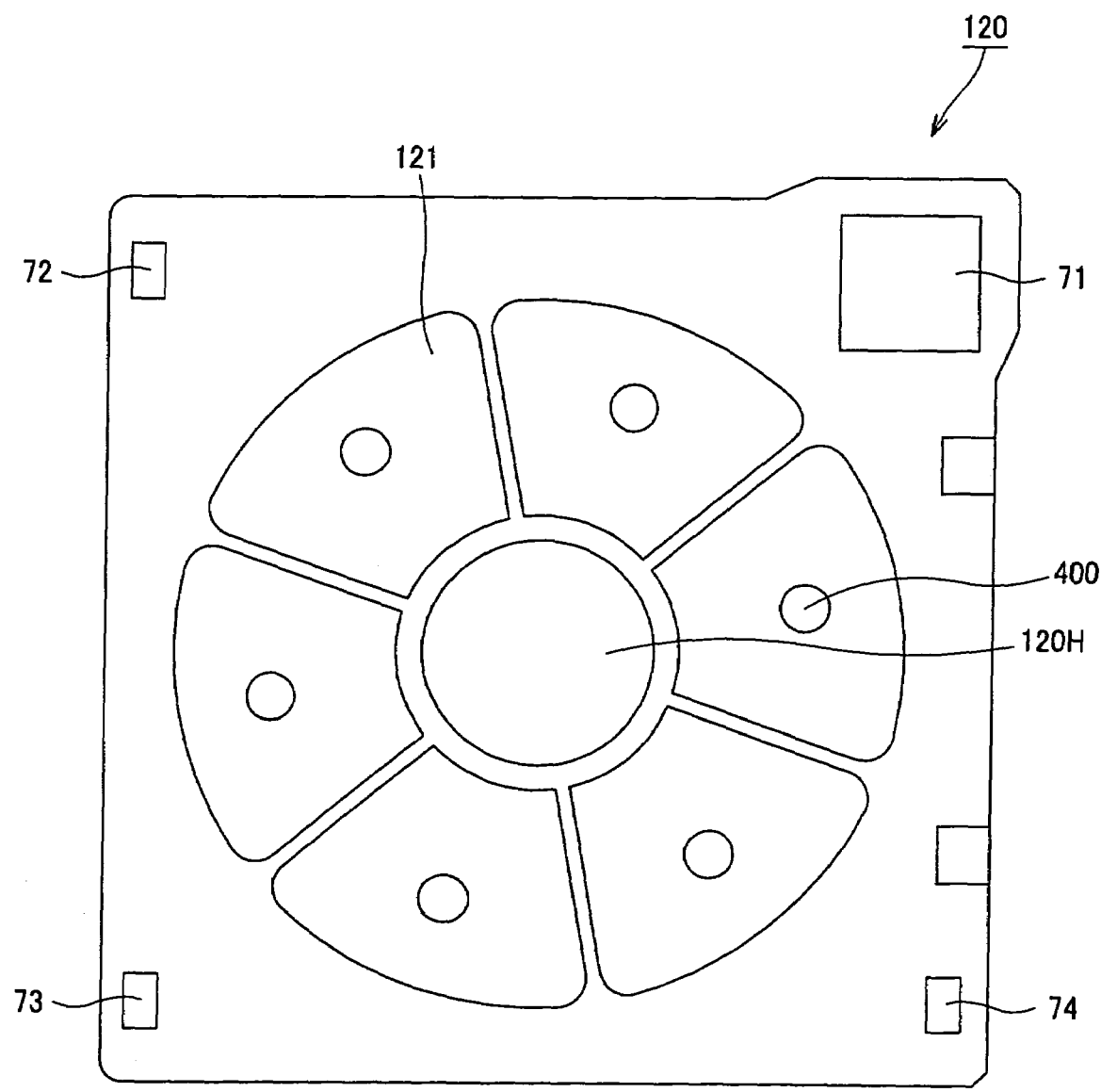
FIG. 10 is a plan view of a flat coil on the stator.

FIG. 10 is a plan view showing an shape example of the driving patterns of the flat coil substrate 120. The driving pattern 121 is generally fan-shaped, and six driving patterns 121 are formed circumferentially of the opening 120H. The flat coil substrate 120 is fixed to the inner surface 47M of the bottom plate 47 shown in FIG. 9 by attaching with an adhesive, for example.

Each of the plurality of electronic parts 71 to 74 is fixed directly to the flat coil substrate 120 by attaching with an adhesive, and electrically connected to a specified point via the flat coil substrate 120. The flat coil substrate 120 is formed from a stack of a plurality of thin flexible wiring boards.

Figure 11:
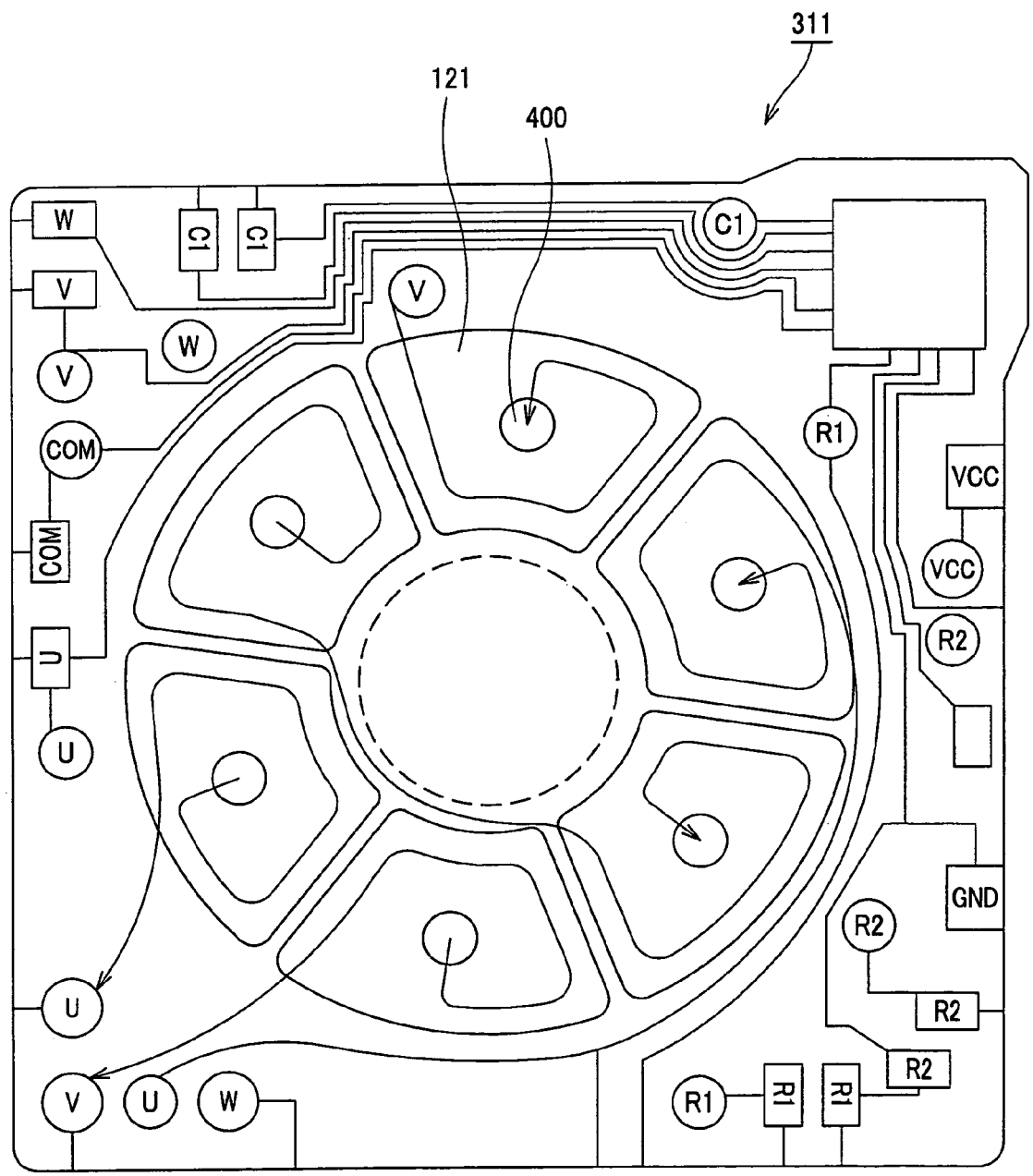
FIG. 11 is a plan view of a first wiring board of a flat coil.
Figure 12:
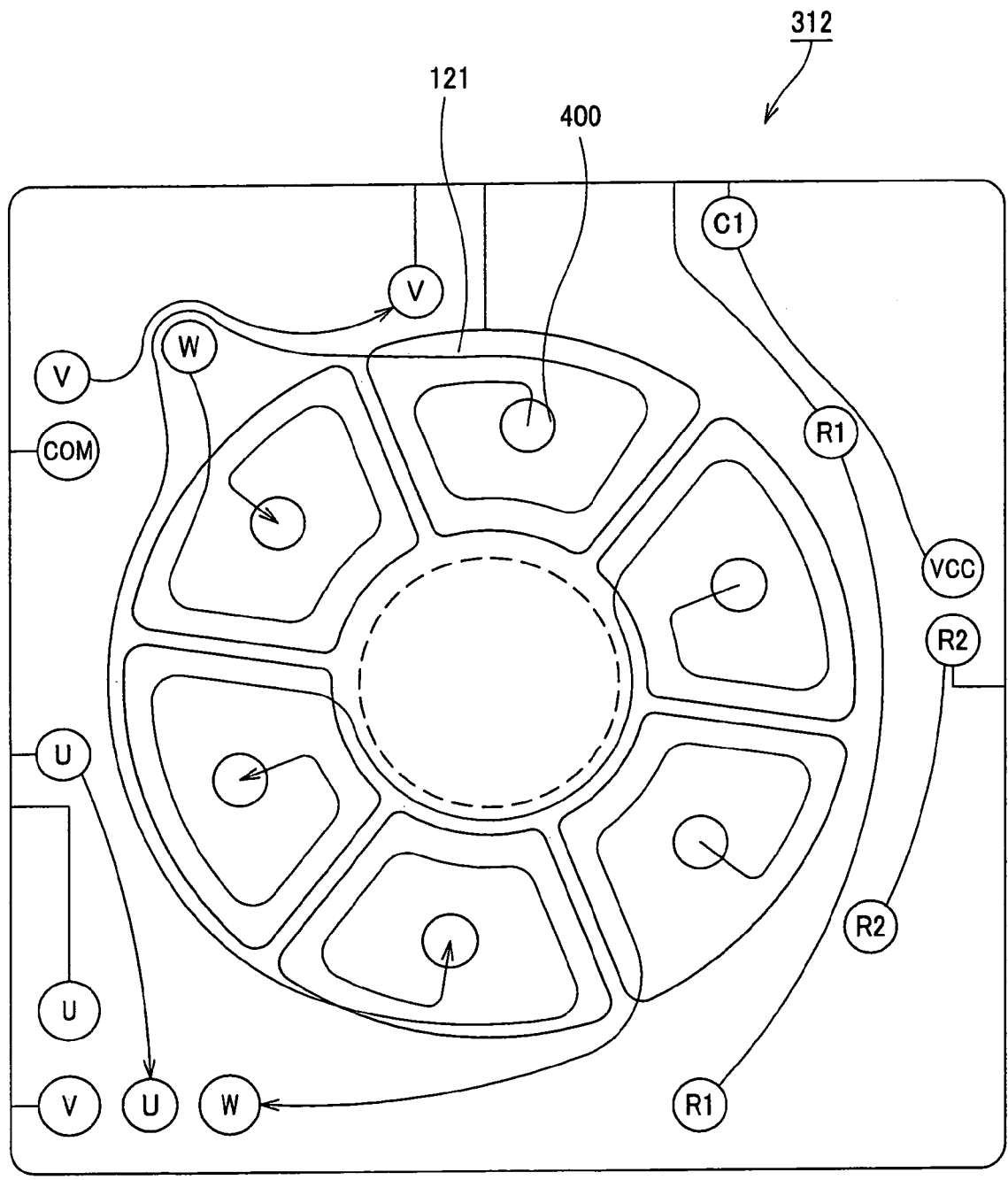
FIG. 12 is a plan view of a second wiring board of the flat coil.
Figure 13:
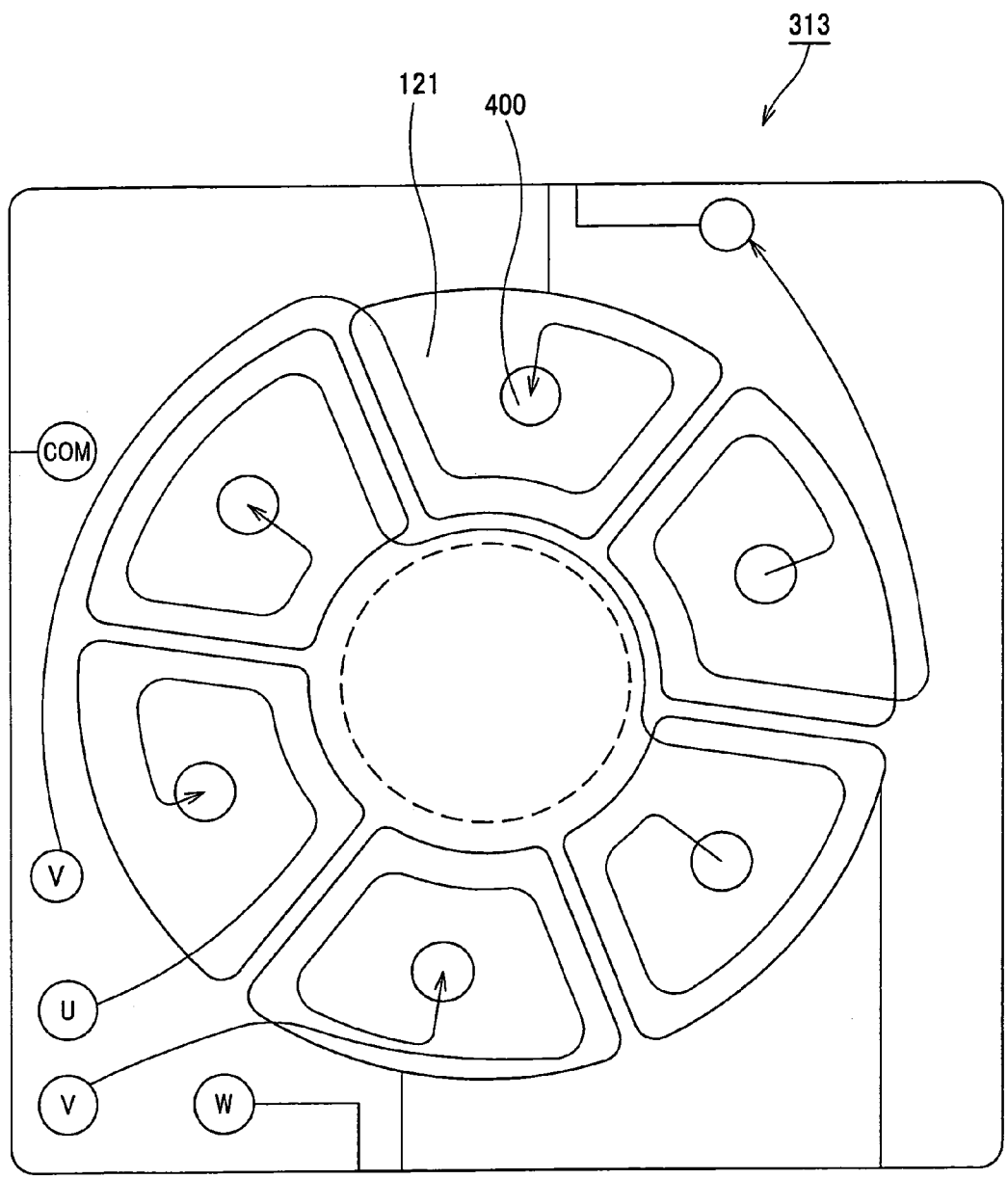
FIG. 13 is a plan view of a third wiring board of the flat coil.
Figure 14:
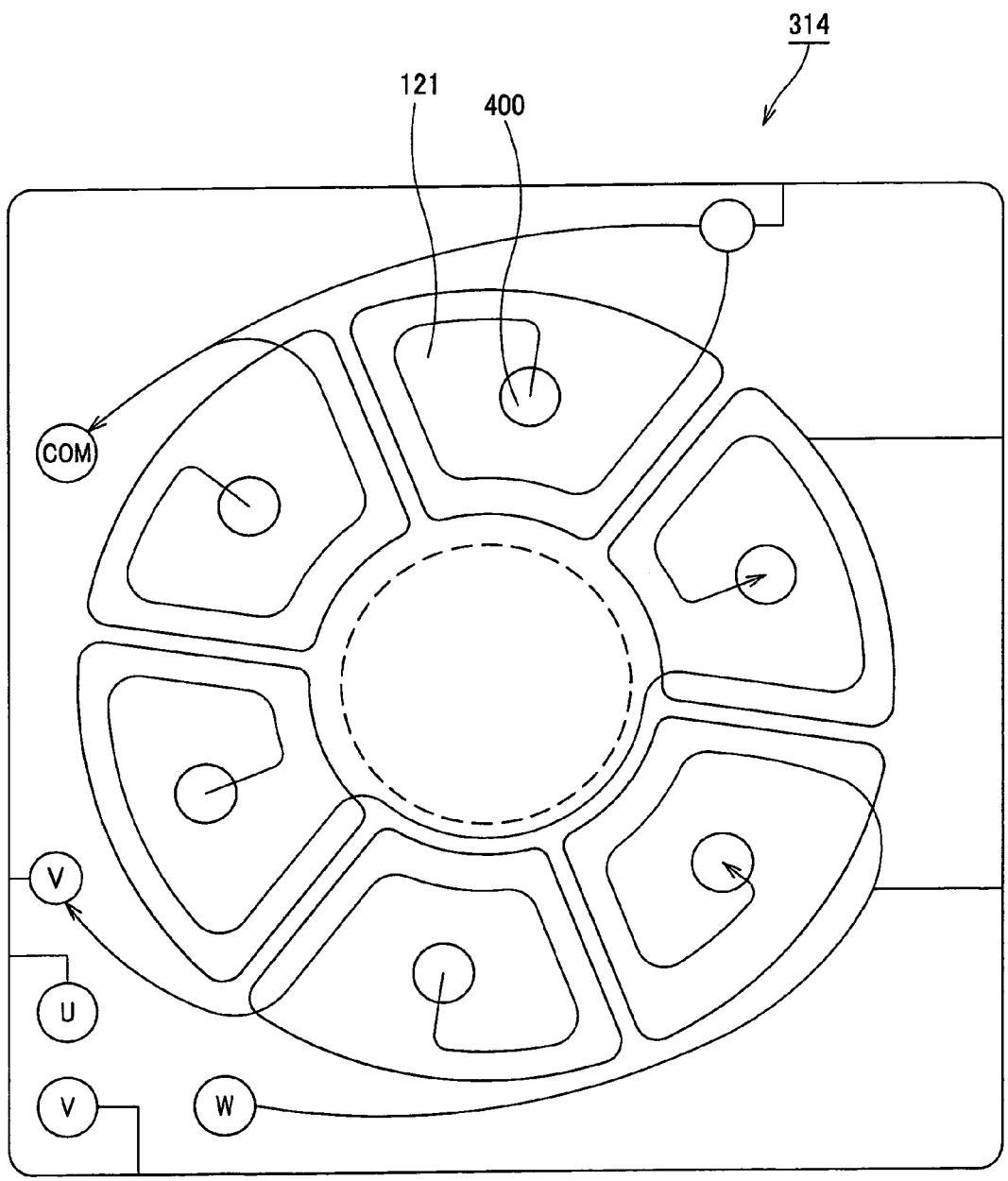
FIG. 14 is a plan view of a fourth wiring board of the flat coil.

FIGS. 11 to 14 are plan views, respectively, showing wiring pattern examples of the plurality of wiring boards. FIG. 11 shows a first wiring board 311, FIG. 12 shows a second wiring board 312, FIG. 13 shows a third wiring board 313, and FIG. 14 shows a fourth wiring board 314.

The wiring boards 311 to 314 are stacked one on the other and electrically connected to each other to provide the driving patterns 121. The driving patterns 121 formed from the stack of the first wiring board 311 to fourth wiring board 314, for example, are advantageous as will be described below:

Since the driving patterns 121 are formed from the stack of the first to fourth wiring boards 311 to 314, for example, they can provide a rather larger magnetic field than the one provided by a single wiring board.

Thus, the rotor 80 can be continuously rotated in relation to the stator 83 with a large driving force under the interaction between the magnetic field developed by supplying a current to the flat coil substrate 120 and magnetic field of the driving magnet 85 provided at the rotor 80.

Therefore, since the weight 87 can generate a large vibration component, so the vibration generator 40 can generate a large vibration irrespectively of its smaller and thinner design.

Each of the first to fourth wiring boards 311 to 314 shown in FIGS. 11 to 14, respectively, has a U-, V- and W-phase wires and a common wire (C). For an larger driving force to rotate the rotor 80, the flat coil substrate 120 is formed from four wiring board layers, for example, as shown in FIG. 8.

Note that the present invention is not limited to the above example but the flat coil substrate 120 may be formed from a single wiring board layer, or a stack of two wiring board layers, three wiring board layers or more than five wiring board layers.

By forming the aforementioned flat coil substrate 120 from a stack of a plurality of the above-mentioned wiring boards (four wiring board layers, for example), it is possible to design the vibration generator 40 thinner and smaller while increasing the torque constant for rotating the rotor 80. Each of the driving patterns 121 is connected to the lead-out electrode of the U, V and W layers, and the lead-output electrodes are electrically connected to the main circuit board 99 shown in FIG. 3.

Each driving pattern 121 of the flat coil substrate 120 shown in FIG. 5 provides a three-phase full-wave energization by a sensorless system, for example, to rotate the rotor 80 in relation to the stator 83 by a three-phase full-wave driving.

Anyway, since the flat coil substrate 120 and flat bottom plate 47 are fixed by attaching, so the vibration generator 40 can be designed thinner in the direction of the central axis CL and smaller in the direction of the diameter.

The thin magnetic plate 48 attached to outside the bottom plate 47 formed from a nonmagnetic material is formed from a magnetic material as described above. So, it generates a force of attraction not developed between the bottom plate 47 and magnet 85 of the rotor 80 to prevent the rotor 80 and the like from being lifted due to their own rotation.

That is, since the bottom plate 47 is formed from a nonmagnetic material, so no force of attraction of the magnet 85 will take place on the bottom plate 47. Thus, the rotor 80 will not be attracted toward the bottom plate 47, and the reduction of the contact friction between the bearing 150 and bottom plate 47 will provide a sufficient running torque even with the smaller, lighter rotor 80.

On the other hand, since no force of attraction takes place between the bottom plate 47 and magnet 85, the rotor 80 will be lifted due to its own rotation, the rotor yoke 89 and bearing 150 will be in contact with the lid member 45 and the clearance between the magnet 85 and flat coil substrate 120 will be varied, which will interfere with the rotation of the rotor 80 unless measures are taken against such lifting, contact and clearance variation.

On this account, according to the present invention, the thin magnetic plate 48 is attached to the bottom plate 47 to attract the magnet 85 toward the bottom plate 47, to thereby prevent the rotor 80 from being lifted due to its own rotation.

Also, since the force of attraction of the magnet 85 can be adjusted by the amount of area of the thin magnetic plate 48, it is possible to set freely and easily a force of attraction which will prevent any rotation loss from being caused by an excessive attraction of the rotor 80 and will prevent the rotor 80 from being lifted due to its own rotation.

The amount of area of the thin magnetic plate 48 is predetermined based on a necessary force of attraction correspondingly to the design specifications of the vibration generator 40. By making a fine adjustment of the area of the thin magnetic plate 48 if the thin magnetic plate products vary in quality from one to another, it is possible to assure a specified rotation of the rotor 80 and prevent the rotor 80 from being lifted, whereby the production yield can be improved considerably.

Also, since the force of attraction of the rotor 80 can be adjusted by modifying the thin magnetic plate 48 to be installed outside, not the bottom plate 47, so the structural strength will not be weakened.

The electronic parts 71 to 74 shown in FIG. 5 include the following, for example. That is, the electronic part 71 is a driver IC (integrated circuit), electronic part 72 is a resistive element, and electronic parts 73 and 74 are capacitors. These electronic parts 71 to 74 are external parts but can be installed directly to the flat coil substrate 120.

The electronic parts 71 to 74 can be mounted collectively on the flat coil substrate 120 by reflowing or the like. Also, the electronic parts 71 to 74 are bare chips, for example. In this case, each of them is about 2 square millimeters in size, for example.

The height of these electronic parts 71 to 74 in the direction of the central axis CL is such that they will not abut the weight 87 on the rotor 80 as shown in FIG. 8. Namely, the weight 87 and electronic parts may be provided to overlap each other in the plane of FIG. 5, whereby the vertical and horizontal dimensions of the vibration generator 40 can be reduced in the plane of FIG. 5.

The vibration generator 40 is electrically connected to the main circuit board 99 shown in FIGS. 7 and 3 via the electrical connecting terminal 270. The electrical connecting terminal 270 is formed from an elastically deformable material. The electrical connecting terminal 270 is electrically connected to the electrode 271 of the main circuit board 99 under pressure. The main circuit board 99 may be formed from a relatively thick, hard substrate such as a glass fiber-reinforced epoxy resin substrate or any other type of material.

The electrical connecting terminal 270 of the vibration generator 40 can electrically connect the driving patterns 121 of the flat coil substrate 120 and electronic parts 71 to 74 to the main circuit board 99.

As shown in FIG. 5, the hole 400 is formed nearly in the center of each of the driving patterns 121. The holes 400 are also shown in FIGS. 4 and 9. Each of the holes 400 is formed in the central portion of each driving pattern 121. The hole 400 is also formed in a corresponding position in the bottom plate 47. Each hole 400 is formed in a position independent of the driving force generating portion of the driving pattern 121.

Figure 16:
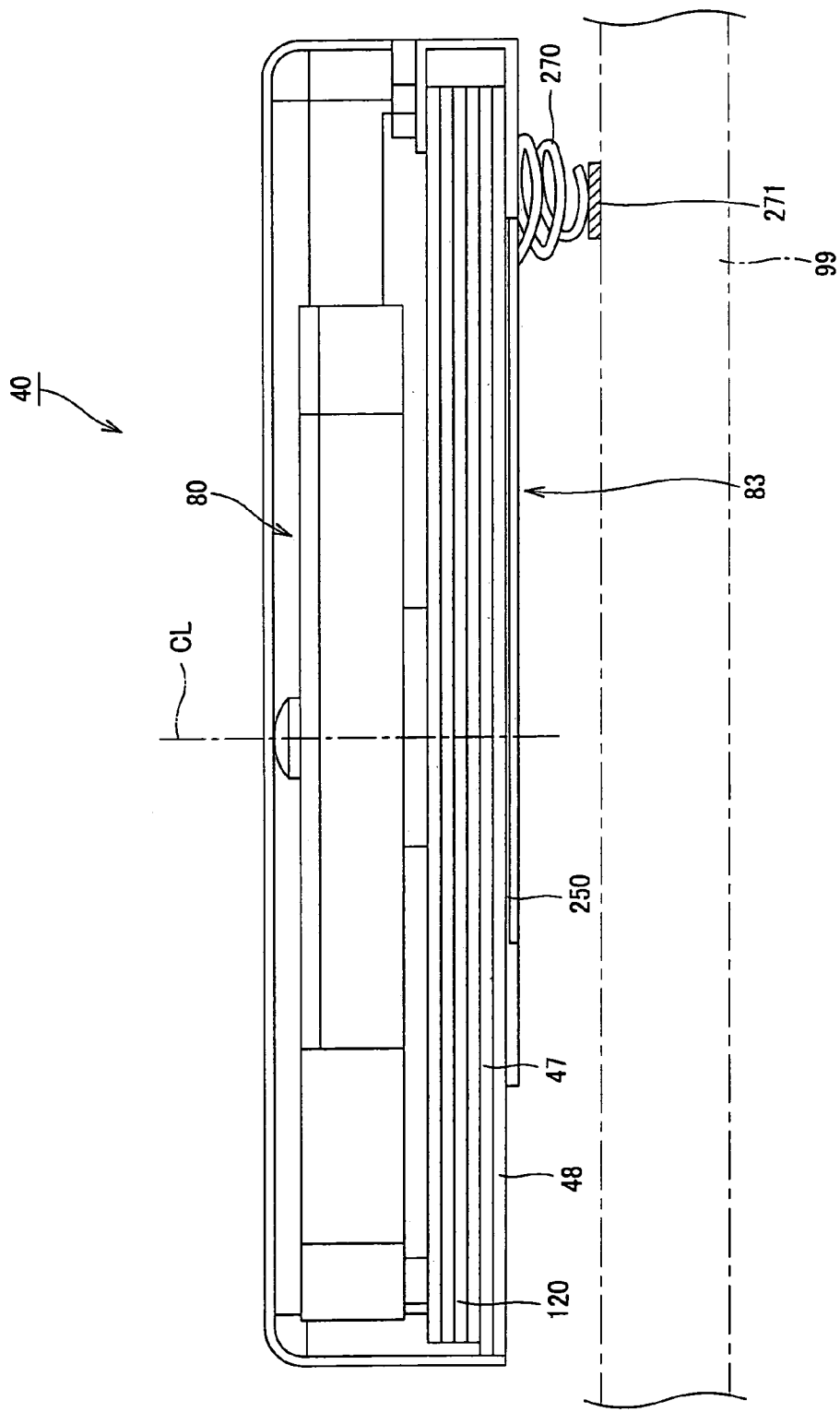
FIG. 16 is a sectional view of another embodiment of the vibration generator.

FIG. 16 is a sectional view of another embodiment of the vibration generator according to the present invention. The vibration generator 40 has a coil-shaped electrical connecting terminal 270 for electrical contact with the main circuit board.

The electrical connecting terminal 270 in the aforementioned embodiment of the vibration generator 40 (see FIG. 7) is a cantilever type formed from a conductive metal. However, the electrical connecting terminal 270 used in this embodiment is a conical coil-shaped one.

Thus, although the electrical connecting terminal 270 is formed from the elastically deformable conductive metal, its necessary area for connection to the main circuit board 99 can be smaller than that of the cantilever-shaped electrical connecting terminal 270 formed from the conductive metal and the circuit board 99 can be formed smaller with an increased freedom of designing.

Figure 17A:
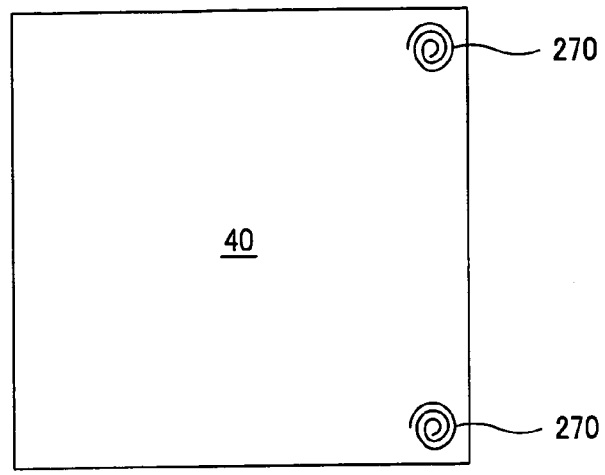
FIGS. 17A to 17C are plan views, respectively, showing the layout of conical coil-shaped electrical connecting terminals.
Figure 17B:
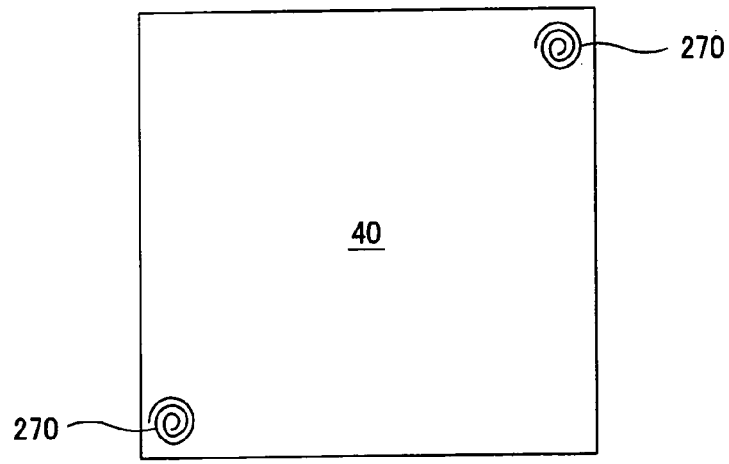
Figure 17C:
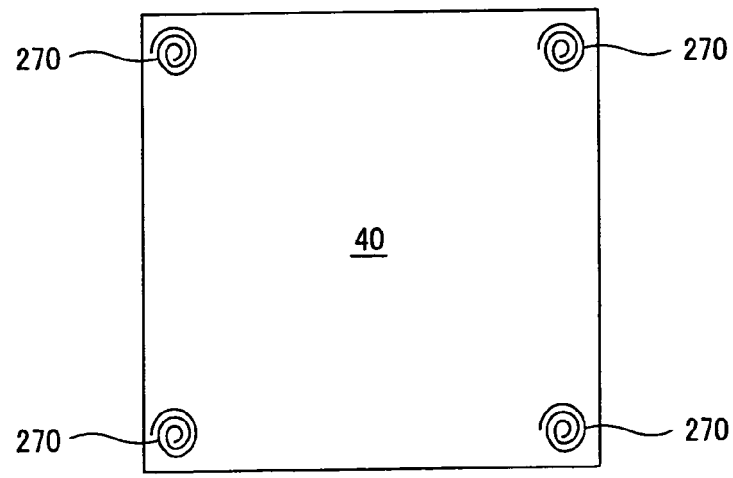

FIGS. 17A to 17C are plan views, respectively, showing the layout of conical coil-shaped electrical connecting terminal used in the vibration generator shown in FIG. 16. FIG. 17A shows an example in which two electrical connecting terminals 270 are disposed to the right of the vibration generator 40 in the plane of FIG. 17A. FIG. 17B shows an example in which two electrical connecting terminals 270 are disposed at the diagonally opposite corners of the vibration generator 40. Either of these layouts may be selected depending upon the layout of the wiring on the circuit board 99 to which the terminals 270 are to be connected.

Also, FIG. 17C shows an example in which four electrical connecting terminals 270 are disposed at all corners, respectively, of the vibration generator 40. The electrical connecting terminals 270 correspond to four phases U, V, W and common, respectively, assigned to the flat coil substrate 120.

Note that the present invention is not limited to this number and layout of the electrical connecting terminals 270 but the number and layout may be set correspondingly to a current to be supplied to the flat coil substrate 120 and layout of the wiring on the circuit board 99.

Figure 18A:
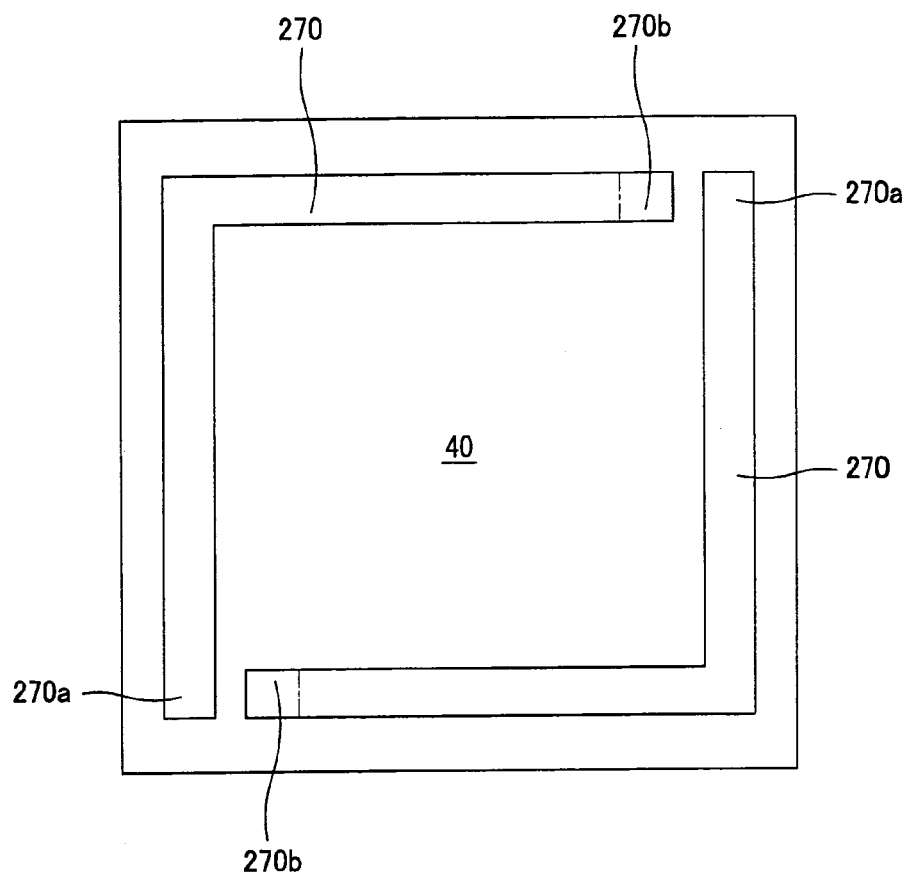
FIG. 18A is a plan view of another embodiment of the electrical connecting terminal, which is a cantilever-shaped one.
Figure 18B:
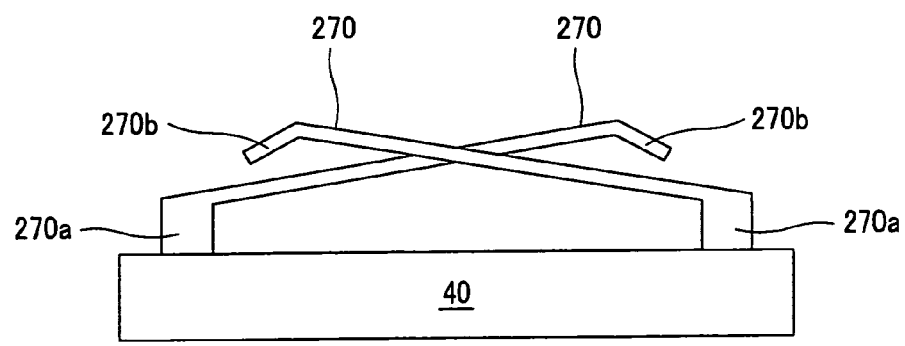
FIG. 18B is a side elevation of the cantilever-shaped electrical connecting terminals.

Also, FIGS. 18A and 18B schematically illustrate other examples of the cantilever-shaped electrical connecting terminal. FIG. 18A is a plan view of the electrical connecting terminal, and FIG. 18B is a side elevation of the cantilever-shaped electrical connecting terminal. As shown, the electrical connecting terminal 270 is of a cantilever type. Namely, it is bent like L in the plan view. The two L-shaped electrical connecting terminals 270 are disposed along two sides of the vibration generator 40.

Because the L-shaped electrical connecting terminals 270 are laid as above, the length from a stationary end 270a thereof to a free end 270b can be larger than the length of a linear electrical connecting terminal. Thus, the connecting terminal has a sufficient elasticity, and the horizontal displacement when the free end 270b touches a pad of the circuit board 99 can be reduced so that the pad may be designed small.

In addition, since the L-shaped electrical connecting terminals 270 are disposed in different directions, respectively, the free ends 270b can be positioned at the diagonally opposite corners of the vibration generator 40, so that two corresponding pads of the circuit board 99 can be placed with a large spacing between them and more freely without any interference between them.

As described above, in the vibration generator 40 according to the present invention, the vibration motor 50 is housed in the case 43 shown in FIG. 3. In this vibration motor 50, the magnet 85 of the rotor 80 faces the flat coil substrate 120 of the stator 83 with a slight spacing between them. Thus, the vibration generator 40 including this vibration motor 50 can be designed considerably thinner in the direction of the central axis CL than the conventional motor with a brush.

The weight 87 is formed from a material whose specific gravity is high, such as tungsten. However, a very thin, small weight 87 will be able to generate a vibration component owing to a large unbalanced rotation-caused energy when the vibration motor 50 rotates the rotor 80.

Also, the lid member 45 of the case 43 shown in FIG. 3 is formed by drawing, which contributes to an improved rigidity as well as to a lighter and thinner design.

Further, using the thin magnet 85 formed from the sintered material and thin flat coil substrate 120 like a flexible printed wiring board contributes to a smaller and thinner design of the vibration generator 40 in the direction of the central axis CL as well as to a smaller power consumption.

Also, the flat coil substrate 120 should preferably be formed from a stack of a plurality of wiring boards. Each of the plurality of wiring boards is called "laminate coil". Each laminate coil is a copper-wire coil formed in polycarbonate which is an insulative material.

The flat coil substrate 120 is fixed directly to the flat bottom plate 47 by attaching with an adhesive or the like. However, the present invention is not limited to such a fixation but the flat coil substrate 120 may be fixed to the bottom plate 47 by mechanical fixation, swaging or clipping.

Also, some electronic parts may electrically be connected to the electrode of the outer layer of the flat coil substrate 120 by wire bonding, for example.

According to the present invention, the stationary shaft 91 at the stator 83 may be fixed to the lid member 45 and bottom plate 47 by welding with YAG laser, for example. However, this fixation of the stationary shaft 91 is not limited to the welding but may of course be done by bonding, press fitting, or swaging. In this case, the stationary shaft 91 may be round at both ends thereof but more preferably the ends should be flat as having previously been described.

Also, the bearing 150 of the rotor 80 may be formed from carbon fiber-reinforced PPS, for example. The cylindrical bearing may be formed from a sintered metal in place of plastic.

Also, according to the present invention, the bearing 150 of the rotor 80 is rotatable in relation to the stationary shaft 91 at the stator 83. Therefore, the rotor will make no precession and shaft will not deflect when the rotor rotates as compared with the conventional supporting of the rotor shaft to be rotatable in relation to the stator bearing.

More particularly, the friction between the rotor bearing 150 and sliding portion of the stationary shaft 91 of the stator 83 will be smaller and thus the vibration generator 40 will have a longer service life. Also, since the bearing 150 at the rotor 80 is supported rotatably in relation to the stationary shaft 91 at the stator 83, so it is possible to reduce the shaft deflection when the rotor 80 of the vibration generator 40 is rotated even if the vibration generator 40 has a smaller axial length. Thus, the vibration generator 40 can be designed thinner and smaller. It should be noted that the more approximate to the length of the stationary shaft 91 the axial length of the bearing 150 is, the smaller the shaft deflection of the rotor 80 will be.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

The vibration generator according to the present invention is applicable to the mobile phone as described above as well as to any other portable communication device such as a personal digital assistance, computer or an electronic device included in any other field.

The invention claimed is:

1. A vibration generator comprising:
a bottom plate having a flat coil substrate installed thereto;
a stationary shaft provided perpendicularly to the bottom plate;
a magnet installed on the stationary shaft with a freely rotatable bearing being disposed between them and opposite to the surface of the flat coil substrate with a slight clearance defined between them;
an unbalancer installed to the magnet; and
a magnetic plate having a predetermined thickness;
wherein, for generating a vibration, a current being supplied to a coil on the flat coil substrate to rotate the magnet and unbalancer,
the bottom plate being formed from a nonmagnetic material; and
the magnetic plate is disposed at the side opposite to the magnet with the flat coil substrate being placed under the magnet,
the magnetic plate utilizes the magnetism of the magnet to attract the magnet toward the flat coil substrate; and
the predetermined thickness of the magnetic plate is configured with a predetermined area so that the force of attraction developed between the magnetic plate and magnet will not cause a variation in clearance between the magnet and surface of the flat coil substrate even if the magnet and unbalancer are rotated.

2. The apparatus according to claim 1, wherein the magnetic plate is removably installed to the bottom plate.

3. An electronic device including a vibration generator, the vibration generator comprising:
a bottom plate formed from a nonmagnetic material having a flat coil substrate installed thereto;
a stationary shaft provided perpendicularly to the bottom plate;
a magnet installed on the stationary shaft with a freely rotatable bearing being disposed between them and opposite to the surface of the flat coil substrate with a slight clearance defined between them;
an unbalancer installed to the magnet; and
a magnetic plate having a predetermined thickness being installed at the side opposite to the magnet with the bottom plate being placed between the magnetic plate and magnet, wherein
the magnetic elate utilizes the magnetism of the magnet to attract the magnet toward the flat coil substrate, and
the predetermined thickness of the magnetic plate is configured with a predetermined area so that the force of attraction developed between the magnetic plate and magnet will not cause a variation in clearance between the magnet and surface of the flat coil substrate even if the magnet and unbalancer are rotated.

4. A vibration generator comprising:
a bottom plate having a flat coil substrate installed thereto;
a stationary shaft provided perpendicularly to the bottom plate;
a magnet installed on the stationary shaft with a freely rotatable bearing being disposed between them and opposite to the surface of the flat coil substrate with a slight clearance defined between them;
an unbalancer installed to the magnet; and
a magnetic plate having a predetermined thickness,
wherein, for generating a vibration, a current being supplied to a coil on the flat coil substrate to rotate the magnet and unbalancer,
the bottom plate being formed from a nonmagnetic material; and
the magnetic plate is disposed at the side opposite to the magnet with the flat coil substrate being placed between the thin magnetic plate and the magnet
the magnetic plate utilizes the magnetism of the magnet to attract the magnet toward the flat coil substrate; and
the predetermined thickness of the magnetic plate is configured with a predetermined area so that the force of attraction developed between the magnetic plate and magnet will not cause a variation in clearance between the magnet and surface of the flat coil substrate even if the magnet and unbalancer are rotated.

* * * * *